United States Patent
Bulst et al.

(10) Patent No.: US 7,076,998 B2
(45) Date of Patent: Jul. 18, 2006

(54) TIRE MEASURING DEVICE WITH A MODULATED BACKSCATTER TRANSPONDER SELF-SUFFICIENT IN TERMS OF ENERGY

(75) Inventors: Wolf-Eckhart Bulst, München (DE); Martin Vossiek, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 7 days.

(21) Appl. No.: 10/712,963

(22) Filed: Nov. 13, 2003

(65) Prior Publication Data

US 2004/0118197 A1 Jun. 24, 2004

(30) Foreign Application Priority Data

Nov. 15, 2002 (DE) ................ 102 53 278

(51) Int. Cl.
G01M 17/02 (2006.01)
(52) U.S. Cl. .................... 73/146; 340/825.54
(58) Field of Classification Search ............ 73/146, 73/598; 343/909; 333/133; 340/825.54
See application file for complete search history.

(56) References Cited

U.S. PATENT DOCUMENTS

| | | | |
|---|---|---|---|
| 5,731,754 A | 3/1998 | Lee, Jr. et al. | 340/447 |
| 6,084,530 A * | 7/2000 | Pidwerbetsky et al. | 340/10.32 |
| 6,739,195 B1 * | 5/2004 | Evans et al. | 73/598 |
| 2001/0004236 A1 | 6/2001 | Letkomiller et al. | 340/572.1 |
| 2003/0164713 A1 | 9/2003 | Dollinger et al. | 324/655 |

FOREIGN PATENT DOCUMENTS

| | | |
|---|---|---|
| DE | 39 37 966 A1 | 5/1991 |
| DE | 42 42 726 A1 | 6/1994 |
| DE | 198 07 004 A1 | 9/1999 |
| DE | 199 46 161 A1 | 4/2001 |
| DE | 199 57 536 A1 | 6/2001 |
| DE | 199 57 557 A1 | 6/2001 |
| DE | 100 10 846 A1 | 9/2001 |
| GB | 2 355 801 A | 10/1999 |
| WO | WO 01/45967 A1 | 6/2001 |

OTHER PUBLICATIONS

J. Stöcker et al.; Erkennung inhomogener Kraftschlußverhältnisse swischen Reifen und Fahrbahn am Beispiel Aquaplaning; VDI Berichte NR. 1088; p. 345-369, 1993.

Grossman, Rainer; "Wireless measurement of tire pressure with passive quartz sensors"; Chair for Electrical Measurements, Technical University Munich, Germany, Mar. 1999.

K. Pannkoke, et al.; "Strukturkonform integrierbare Funktionsmodule auf der Basis von PZT-Fasem"; Fraunhofer-Institut für Keramische Technologien under Sinterwerkstoffe IKTS, Dresden.

(Continued)

*Primary Examiner*—Edward Lefkowitz
*Assistant Examiner*—Andre Allen
(74) *Attorney, Agent, or Firm*—Baker Botts L.L.P.

(57) ABSTRACT

A tire measuring device has a converter for converting the ambient energy to an alternating value, and a reflector that can be modulated by the alternating value.

17 Claims, 7 Drawing Sheets

OTHER PUBLICATIONS

B.Z. Janos et al.; Overview of Active Fiber Composites Technologies; Active Materials and Structures Laboratory; MIT; Cambridge, MA.

Michael Voigts, et al.; "Dielectric Properties and Tunability of BST and BZT Thick Films for Microwave Applications"; Integrated Ferroelectrics, vol. 39, pp. 383-392, 2001.

Walter F. Kern; "Über Verformungsmessungen an Kraftfahrzeugreifen mittels spezieller Dehnungsgeber"; Automobiltechnishe Zeitschrift, Feb. 1961.

M. Vossiek, et al.; "Precise 3-D Object POsition Tracking Using FMCW Radar"; 29th European Microwave Conference, Munich Germany, Oct. 1999.

* cited by examiner

TIRE MEASURING DEVICE WITH A MODULATED BACKSCATTER TRANSPONDER SELF-SUFFICIENT IN TERMS OF ENERGY

PRIORITY

This application claims foreign priority of the German application DE 10253278.8 filed on Nov. 15, 2002.

TECHNICAL FIELD

The invention notification concerns methods and devices for the basic components of radio-interrogatable tire sensors self-sufficient in terms of energy and exemplary remedies of radio-interrogatable tire sensors self-sufficient in terms of energy which are based on the components according to the invention.

BACKGROUND OF THE INVENTION

Tire parameters of a motor vehicle such as tire pressure, temperature, but also the frictional connection between the tire and the road surface are decisive values for the safety and road handling control for motor vehicles. Because of the high relevance of this topic, numerous remedies were developed in the past for tire sensors and the relationships between tire pressure, tire temperature, stress value, elongation value and the coefficient of friction, frictional connection, road surface texture, rolling friction, aquaplaning, etc. intensively discussed. Basic information can be found in, for example, DE 3937966 A1, DE 4242726 A1 and W. F. Kern: "Über Verformungsmessung an Kfz Reifen mittels spezieller Dehnungsmesser" (about deformation measurement on motor vehicle tires by means of a special extensometer), Automobiltechnische Zeitschrift ATZ, 63 (1961) pp. 33et seq.

In general, sensors have an electrical cable connection through which the sensor is supplied with energy and through which the measured values of the sensor are relayed electrically. In general, for tire sensors such a remedy is unsuitable because the rotation would require slip rings or similar devices for conduction through a cable. Therefore, the sensor values of tire sensors are usually transmitted via radio from the site of the measurement to a remote evaluation unit.

However, many well-known radio sensors have a considerable disadvantage: They need a battery or similar energy sources for which procurement and especially maintenance gives rise to considerable costs or dangers (leakage of battery acids, out-of-balance, etc.). The use or the service life of batteries is often also limited by the environmental conditions (e.g. very high or low temperatures).

Characteristic for a wheel is that it has parts that rotate when moving and that these rotations:
  cause, on the one hand, both vibrations and sound and/or ultrasound signals in the bearings and/or at the points of contact wheel/road surface,
  and, on the other hand, the rotation leads to mechanical forces and deformations of, for example, the tire.

Therefore, these two mechanical energy forms, at least as soon as the vehicle starts moving, are available at the location or in the vicinity of the location where the tire sensor is to operate.

A sound converter or a piezoconverter can convert this acoustic or mechanical energy to an electrical alternating signal. According to the invention, this energy is used for operating one or more sensors that transmit their state or status transition via radio.

Furthermore, radio sensors self-sufficient in terms of energy are also well-known from the prior art in which the available mechanical energy is used to operate a radio sensor. In principle, the use of piezoelectric elements is also known for this purpose.

Wireless, passive quartz sensors for tire measuring devices are known from R. Grossmann: "Wireless Measurement of Tire Pressure with Passive Quartz Sensors", Proceedings of the SPIE, SPIE Vol. 3670, pages 214 to 222, Newport Beach, 1999.

SUMMARY OF THE INVENTION

Taking this as a starting point, the object of the invention is to develop a tire measuring device self-sufficient in terms of energy which is very cost-effective, robust and can easily be made in large quantities.

This object is achieved by a tire measuring device comprising a converter for converting ambient energy to an alternating value, and a reflector that can be modulated via the alternating value.

The reflector can be a reflector for an electromagnetic signal, particularly, for a high-frequency signal. The tire measuring device may further comprise an antenna. The tire measuring device can be a backscatter transponder. The tire measuring device can be equipped to measure a measured value. The converter may converts the ambient energy to an alternating value as a function of a measured value. The tire measuring device may have means to influence the alternating value as a function of a measured value. The tire measuring device may further comprise means for generating a first alternating value and a second alternating value. The first and second alternating values can be alternating values which are derived from an original alternating value that can be broken down and wherein, after the breakdown, the first and second alternating value can be influenced differently by a measured value. The tire measuring device may further comprise a second converter for generating the second alternating value. The tire measuring device may further comprise a piezoelectric layer as energy converter, and a layer with a controllable dielectric. The converter may contain a piezoelectric fiber or is formed by one or several piezoelectric fibers. The tire measuring device may be installed in a tire or in the tires of a vehicle or to the rim of a wheel. The tire measuring device can be connected to the tire cover and/or vulcanized into the tire.

The object can also be achieved by a method for tire measurement comprising the steps of:
  converting the ambient energy to an alternating value, and
  modulating a reflector via the alternating value.

The step of converting the ambient energy to an alternating value can be performed as a function of a measured value. The method may further comprise the step of influencing the alternating value as a function of a measured value. The method may further comprise the step of generating a first alternating value and a second alternating value. The first and second alternating values can be alternating values which are derived from an original alternating value that can be broken down and wherein, after the breakdown, the first and second alternating value can be influenced differently by a measured value.

The invention is based on two basic ideas. The first one consists of separating the generation of energy for the information to be transmitted via the high-frequency transmitter self-sufficient in terms of energy and the generation of energy that is required for the transmission process itself. Based on the knowledge that in the minimum case only energy for information to be transmitted must be generated, energy generations for the transmission process itself and the components needed for it can be dispensed with.

This knowledge follows numerous detailed deliberations about the appearance of a minimum component configuration for a high-frequency transmitter self-sufficient in terms of energy. These deliberations finally lead to the idea to use an alternating value generated by a converter directly and without intermediate storage for modulating the signal of the high-frequency transmitter. Therefore, the rectifier circuits needed in the prior art or elements with a non-linear characteristic curve that are usually required to accumulate alternating energy can be dispensed with. As a result, all the elements that would be required for energy storage can also be dispensed with.

If the alternating value is finally used for modulating a reflector, the generation of energy for the transmission process itself can be dispensed with since the energy of an interrogation signal is utilized.

Accordingly, the tire measuring device features a converter for converting the ambient energy to an alternating value, and a reflector that can be modulated by the alternating value.

In order to operate the tire measuring device that transmits its status or status transitions by radio, ambient energy from the surroundings of the converter is used as energy that is available in situ (i.e. at the location or in the immediate vicinity of the tire measuring device). This energy can be thermal energy, acoustic energy, mechanical or electrical or electromagnetic energy. One requirement is that the available energy or the value derived or converted from it is an alternating value and is used for measuring and/or for the radio data transmission of a measured quantity as shown below. The alternating value, in particular, is an alternating voltage and/or an alternating current.

Therefore, the principle according to the invention distinguishes itself by means of the fact that the alternating value derived from the available local energy is used to modulate a radio wave reflector in its reflection characteristics, particularly its reflection factor.

The reflector is preferably a reflector for an electromagnetic signal, particularly for a high-frequency signal. A radio signal can be sent from a base station to this radio wave reflector from a distance. This radio signal preferably lies in the frequency range from 100 kHz to 100 GHz. The signal transmitted from the base station is reflected at the radio wave reflector. For this, the tire measuring device preferably has an antenna. Therefore, the tire measuring device forms a backscatter transponder self-sufficient in terms of energy.

Because the reflector is modulated in its reflection factor by the implied alternating value, a modulation is superimposed on the signal reflected by the radio wave reflector. The base station receives the modulated reflection signal of the sensor and evaluates it. Because of the modulation, the reflected signal can very easily be distinguished from other fixed reflections that, for example, are produced on objects that are in the detection range of the sensor.

The tire measuring device is preferably set up to measure a measured quantity in the form of a sensor value to be measured.

In the simplest case, the measured quantity can be the alternating value, that is in the radio signal the modulation itself. Depending on the measured quantity, the converter then converts the ambient energy to the alternating value so that the measured quantity can be measured via the modulation of the reflector.

Alternatively or additionally, the alternating value can also be influenced by the measured quantity or a further measured quantity in a characteristic way in a somewhat more complicated embodiment of the principle. For this purpose the tire measuring device has means of influencing the alternating value as a function of a measured quantity so that the measured quantity can be measured via the modulation of the reflector. These means, particularly, are arranged in or on a feed line that feeds the alternating value to the reflector. Suitable means, for example, are state-specific passive filters or attenuators or state-specific energy converters that influence or specify the alternating signal and, with that, the modulation as a function of the measured quantity in a characteristic way.

The energy for modulating the backscatter for a sensory purpose is obtained from the energy of the measured quantity or from energy events that go along with changes to the measured quantity and, therefore, forms a self-sufficient remote radio sensor that can be read out. In principle, the transmitting and receiving part of the base station and the signals used can be designed identically to the normal backscatter systems.

The tire measuring device can be implemented particularly easily and robustly as a completely ceramic element. To this end, the tire measuring device has a piezoelectric ceramic layer as the energy converter, a ceramic layer with a controllable dielectric arranged on it and a ceramic antenna arranged on the layer with a controllable dielectric via an antennae carrier layer.

A method according to the invention is obtained in the same way as the tire measuring device. This also applies to its preferred further developments.

BRIEF DESCRIPTION OF THE DRAWINGS

Further important advantages and features of the invention will emerge from the description which follows of an embodiment and the accompanying drawings. The diagrams show.

DETAILED DESCRIPTION OF THE PREFERRED EMBODIMENTS

Figure 1:
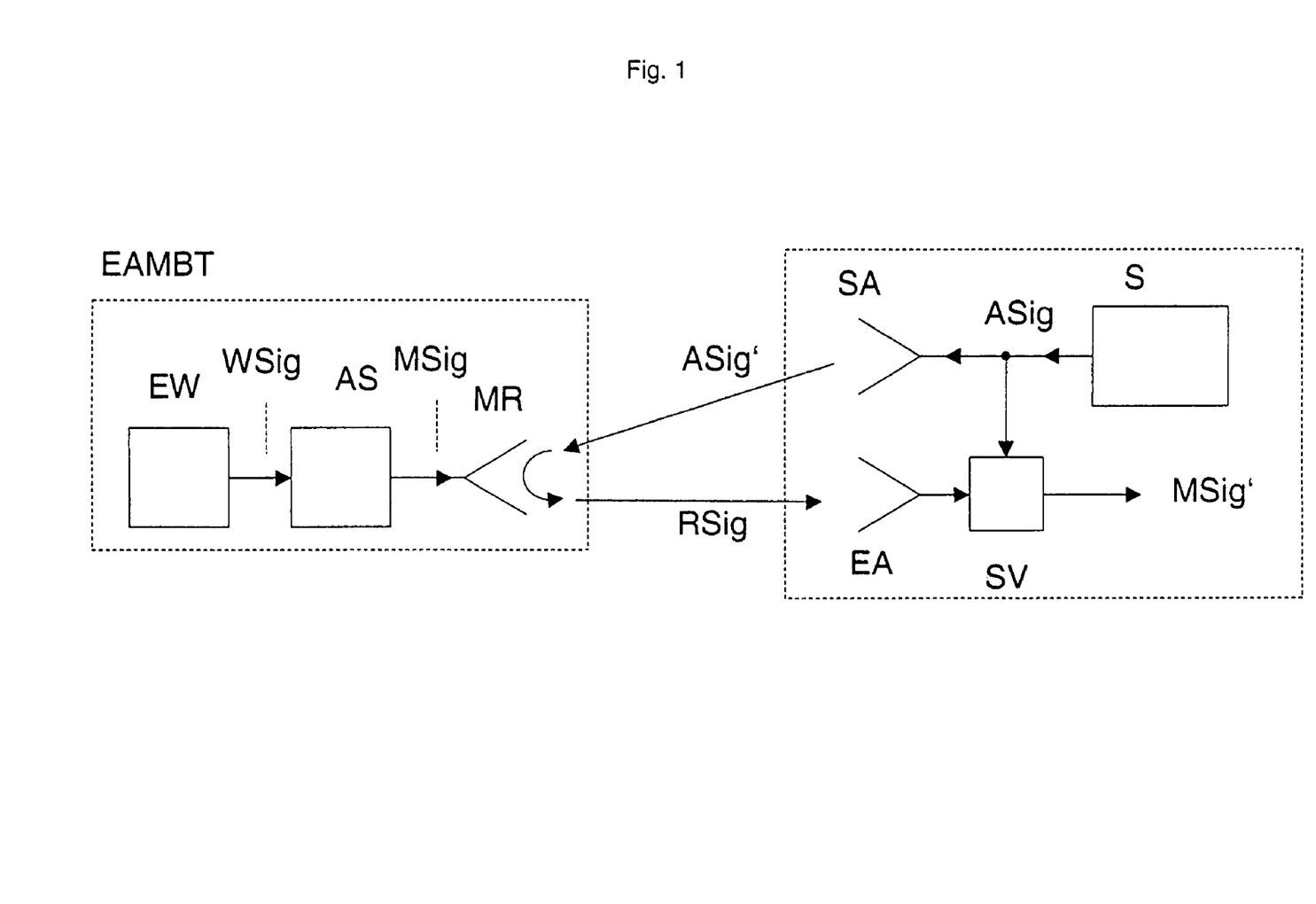
FIG. 1 the basic structure of a modulated backscatter transponder self-sufficient in terms of energy and a remotely-interrogatable radio sensor self-sufficient in terms of energy, FIG. 2 a possible embodiment of a modulated backscatter transponder self-sufficient in terms of energy as a remotely interrogatable structure-borne sound sensor self-sufficient in terms of energy, FIG. 3 a possible embodiment of a modulated backscatter transponder self-sufficient in terms of energy as a temperature sensor, FIG. 4 an embodiment with two paths, FIG. 5 a tire and a tire measuring device, FIG. 6 a rim and a tire measuring device, FIG. 7 a complete ceramic tire measuring device, FIG. 8 a tire measuring device with a piezoelectric fiber as the converter, FIG. 9 a tire measuring device with a piezoelectric fiber as the converter that is fitted on or in a tire cover and FIG. 10 a complete ceramic tire measuring device with piezofibers.

FIG. 1 shows the basic structure of the modulated backscatter transponder self-sufficient in terms of energy and a remotely-interrogatable radio sensor self-sufficient in terms of energy. The modulated backscatter transponder self-sufficient in terms of energy EAMBT includes at least the following components. The energy converter EW converts the available ambient energy in the form of an energy alternating value to an electrical alternating value or an alternating signal WSig.

Optionally, this alternating signal is adapted by another interface circuit so that, as resulting modulation signal Msig, it is particularly well suited for modulating the reflector MR that can be modulated. The original alternating value in the form of an alternating signal is in this case thus converted to a derived alternating value in the form of a modulation signal.

It can be especially useful for this interface circuit to include a transformer. The reflector that can be modulated, for example, can be an antenna for which matching to its input or output is varied with the modulation signal MSig. Depending on its matching, the antenna reflects a radio signal that receives it more or less strongly (amplitude modulation) or reflects it with a more or less large phase shift (phase modulation) or reflects at different strengths depending on the modulation signal MSig at different frequencies (frequency modulation). This effect of the modulated reflection is used for that in the further embodiment to remotely interrogate the backscatter transponder EAMBT by radio with a base station BS.

For this purpose, the base station contains at least one signal source S by means of which the interrogation signal ASig is generated and radiated via a transmitting antenna as radio signal ASig' in the direction of the backscatter transponder EAMBT. This signal is reflected as a modulated signal at backscatter transponder EAMBT. The radio signal RSig reflected in this way is received via a receiving antenna and compared by means of a signal comparator SV with the transmitted interrogation signal ASig. Apart from a small delay as a result of the path from the base station to the backscatter transponder EAMBT and back and, if required, superimposed interference signals, the interrogation signal ASig and the reflected radio signal RSig only differ because of the modulation that was superimposed by the backscatter transponder EAMBT on the reflected radio signal RSig. Therefore, by comparing the interrogation signal ASig and the reflected radio signal RSig, an image MSig' of the modulation signal MSig can be formed directly in the base station and thus the energy alternating value belonging to the measured quantity self-sufficient in terms of energy can be measured remotely by radio.

The modulated backscatter transponder self-sufficient in terms of energy and the remotely-interrogatable radio sensor self-sufficient in terms of energy can be developed and used in various ways according to the invention.

Figure 2:
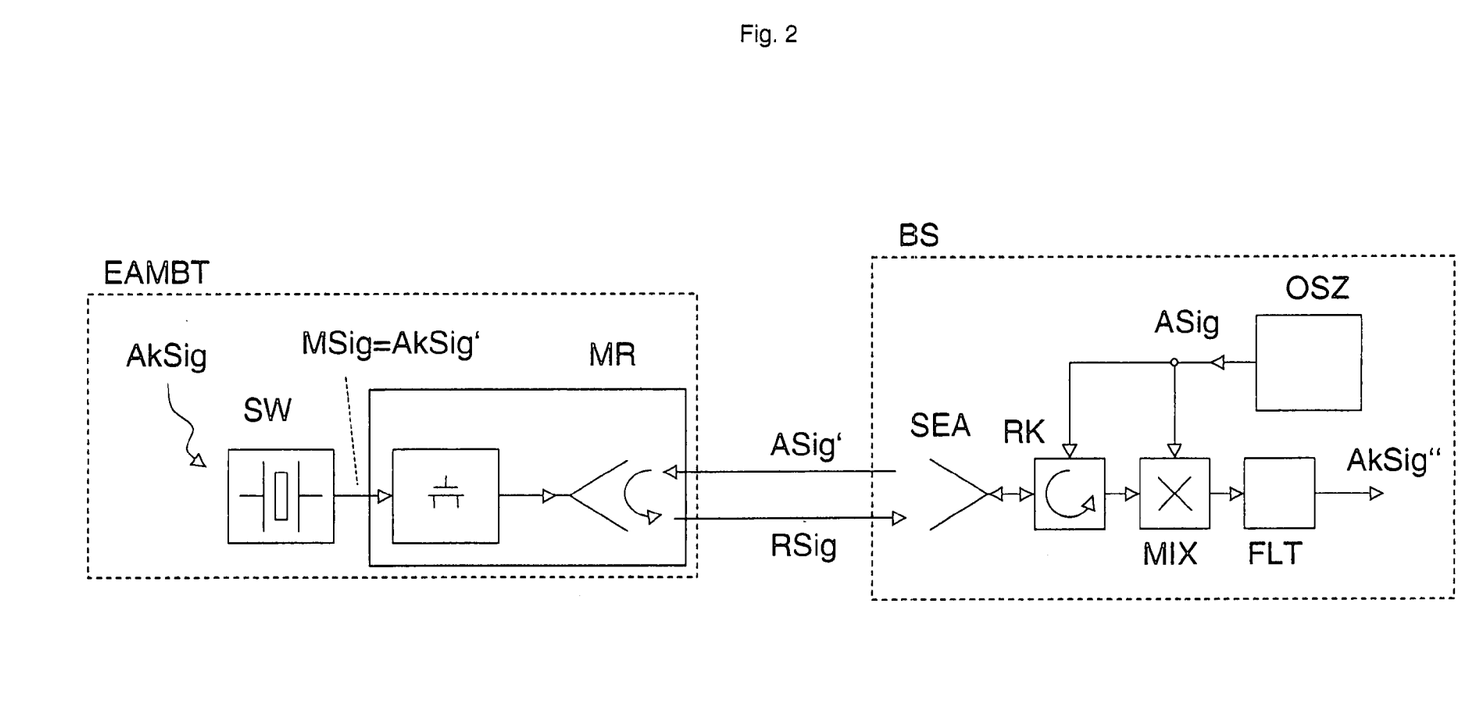

FIG. 2 shows a simple embodiment as a remotely-interrogatable structure-borne sound sensor self-sufficient in terms of energy. Here, the energy converter is a sound converter, preferably a piezoelectric sound or ultrasound converter. Should it receive an acoustic signal AkSig, it converts it into an electrical signal. In principle, this electrical modulation signal MSig=AkSig' used below to modulate the reflector that can be modulated, is an image of the acoustic signal. The reflector that can be modulated preferably includes a field effect transistor by means of which the matching of its antenna is varied as shown above. Preferably, those types of field effect transistors that can also be modulated around the operating point 0V, i.e. without additional bias voltage, are used.

Field effect transistor types suitable for this circuit are SST310 from Vishay or perhaps MGF4953 A from Mitsubishi, for example.

Of course, as well as field effect transistors, all other components that change their or a conductance value or the reflection or transmission function depending on the applied voltage are also suitable for the purpose. Transistors, diodes, varactors, controllable dielectrics, micromechanical switches or phase shifters (MEMs), etc. would, for example, be suitable.

The base station BS contains a fixed frequency oscillator OSZ that generates the interrogation signal ASig. The interrogation signal is reflected via the transmit/receive antenna SEA which is a combined unit in this embodiment. The transmit/receive antenna SEA also serves to receive the modulated reflected signal RSig. The directional coupler RK serves to separate the transmitting and receiving signal. The signal comparison already described in FIG. 1 is carried out here with a mixer, i.e. the transmitting signal ASig is mixed with the reflected signal RSig and preferably filtered subsequently with a filter FLT. The filter FLT is preferably embodied as a bandpass or lowpass. The limiting frequencies of FLT must preferably be selected in such a way that they conform to the limits of the frequency range concerned of the acoustic signal AkSig or to those of the modulation signal MSig. Because of the shown mixing arrangement, the modulation, i.e. in principle the modulation signal MSig is separated from the carrier, i.e. in principle ASig. Therefore, it is possible to plot and show or process further an image AkSig" from AkSig' or AkSig at the output of filter FLT.

The main feature of the embodiment of the base station shown here is a normal continuous wave or Doppler radar. Therefore, all the well-known embodiments of such systems can be transferred directly to the solution according to the invention. Also the option of modulating the reflection factor or the matching of an antenna via a field effect transistor is in many cases takes numerous forms in the prior art. Therefore, well-known circuits can easily be transferred to the solution according to the invention. More detailed embodiments of these components are, therefore, no longer shown here, because they are known to the experts or they can be researched in the relevant literature.

Of particular relevance at this point is the fact that in the case of a more complicated embodiment of the base station it is also possible to determine the distance to a backscatter transponder with modulated reflection. Embodiments that can be transferred to a modulated backscatter transponder self-sufficient in terms of energy EAMBT can be found in M. Vossiek, R. Roskosch and P. Heide: "Precise 3-D Object Position Tracking using FMCW Radar", 29th European Microwave Conference, Munich, Germany, 1999, and in the documents DE 19957536 A1, DE 19957557 A1 and, in particular, in DE 19946161 A1.

Of course, as alternatives to the sound sensor shown, other converter principles can also be used in an arrangement that is otherwise the same, for measuring other values. Pyroelectric converters, photoelectrical converters, piezoelectric pressure or bending converters or also widely-used generator principles with a magnet and coil would be suitable candidates.

The following frequencies which are useful and normal in transponder systems are preferably used as interrogation signal of the base station, i.e. 125 kHz, 250 kHz, 13.7 MHz, 433 MHz, 869 MHz, 2.45 GHz or 5.8 GHz. It is also useful for the frequency of the interrogation signal to be selected to be much higher, for example, by a factor of 10, than the frequency of the alternating value WSig since the carrier, i.e. the interrogation signal can then be separated more easily from the modulation, i.e. WSig, in the base station using simple means.

However, based on previous embodiments many other developments of sensor and identification systems can still be implemented. The basic idea here is that alternating signal generated by the converter no longer only directly contains the sensor information itself, but that the nature of this signal is changed characteristically by a further effect or a further measured value and the measured value can be derived from the value of the change in the base station. Of course. The characteristic change could also be initiated intentionally and in a defined way in the sense of a coding with the objective of being able to identify objects.

Figure 3:
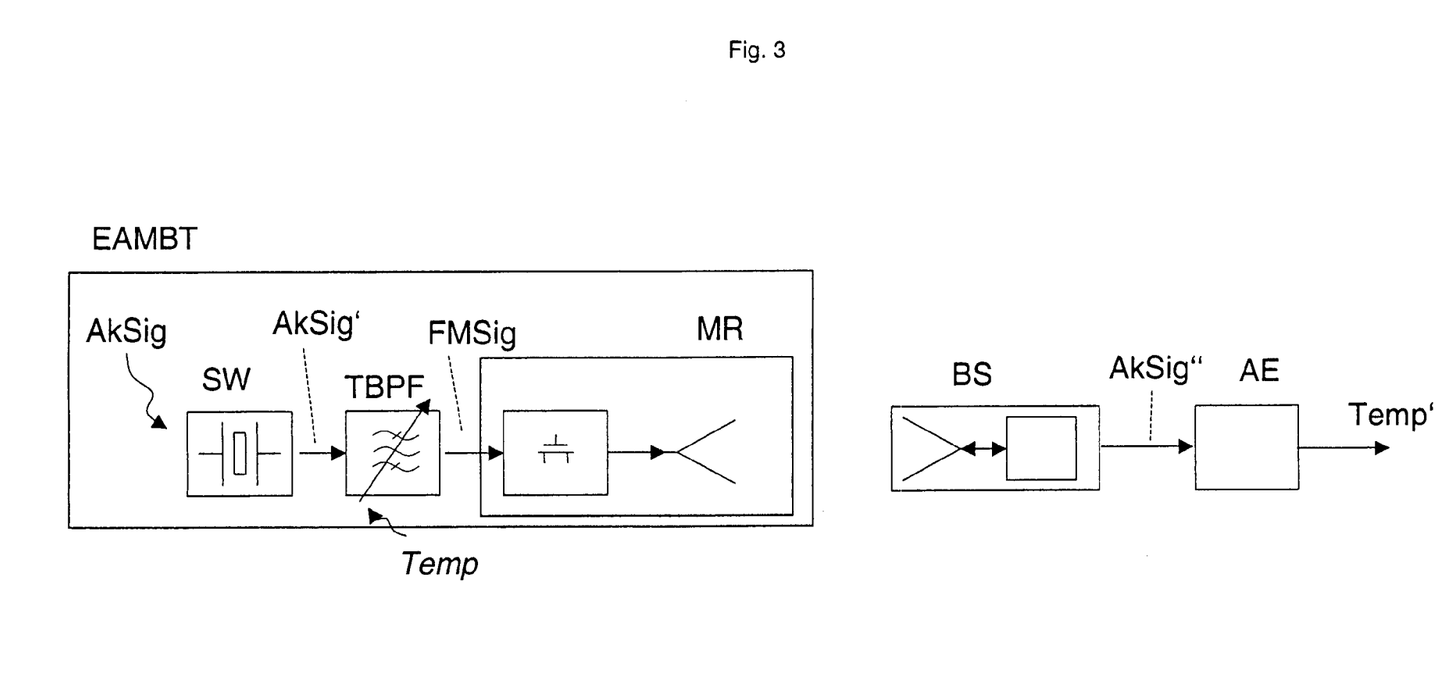

The basic idea of the further development is shown using the simple embodiment in FIG. 3. In principle, this is the same embodiment as in FIG. 2. The difference is the fact that the electrical alternating value AkSig' is now not used directly for modulating the reflector MR that can be modulated, but is filtered beforehand, for example, via a temperature-dependent bandpass filter TBPF characteristically depending on the temperature. In this way, the temperature of a tire can, for example, be measured. Detuning the filter can easily be implemented by temperature-dependent resistances or the like.

Assuming that the frequencies of the acoustic signal are distributed almost equally over a longer observation period over the detuning range of TBPF or the distribution is known to some extent, then the spectral power density distribution or the values derived from it such as the focal point or the maximum of the spectrum from AkSig" is a direct measurement for the temperature. For example, these values could easily be derived via a Fourier transformation from AkSig" in an evaluation unit AE.

Of course, in addition to filtering, other influences determined by the measured quantities WSig for coding the measured quantity are conceivable. Suitable candidates would be, for example, delay elements, phase shifters, attenuators. When using filters, resonator filters with bandpass or band stop properties are particularly suitable because, on the one hand, their influence on the signal properties can be evaluated with simple means and, on the other hand, they can be implemented easily.

Equally conceivable would be that the conversion characteristics of the converter itself are changed by a physical or chemical value, i.e. for example, that the frequency of a sound converter is temperature-dependent or depends on general mechanical conditions such as pressure or voltage.

Not just temperature sensors, but also pressure sensors, humidity sensors or chemical, radio-interrogatable sensors self-sufficient in terms of energy can be implemented in this way. In principle, any passive sensor element with which the modulation signal MSig can be changed in a characteristic way is suitable. Of course, the modulation signal MSig must not only serve exclusively as carrier for the sensor information, but can also carry sensor information, as has been shown above.

Figure 4:
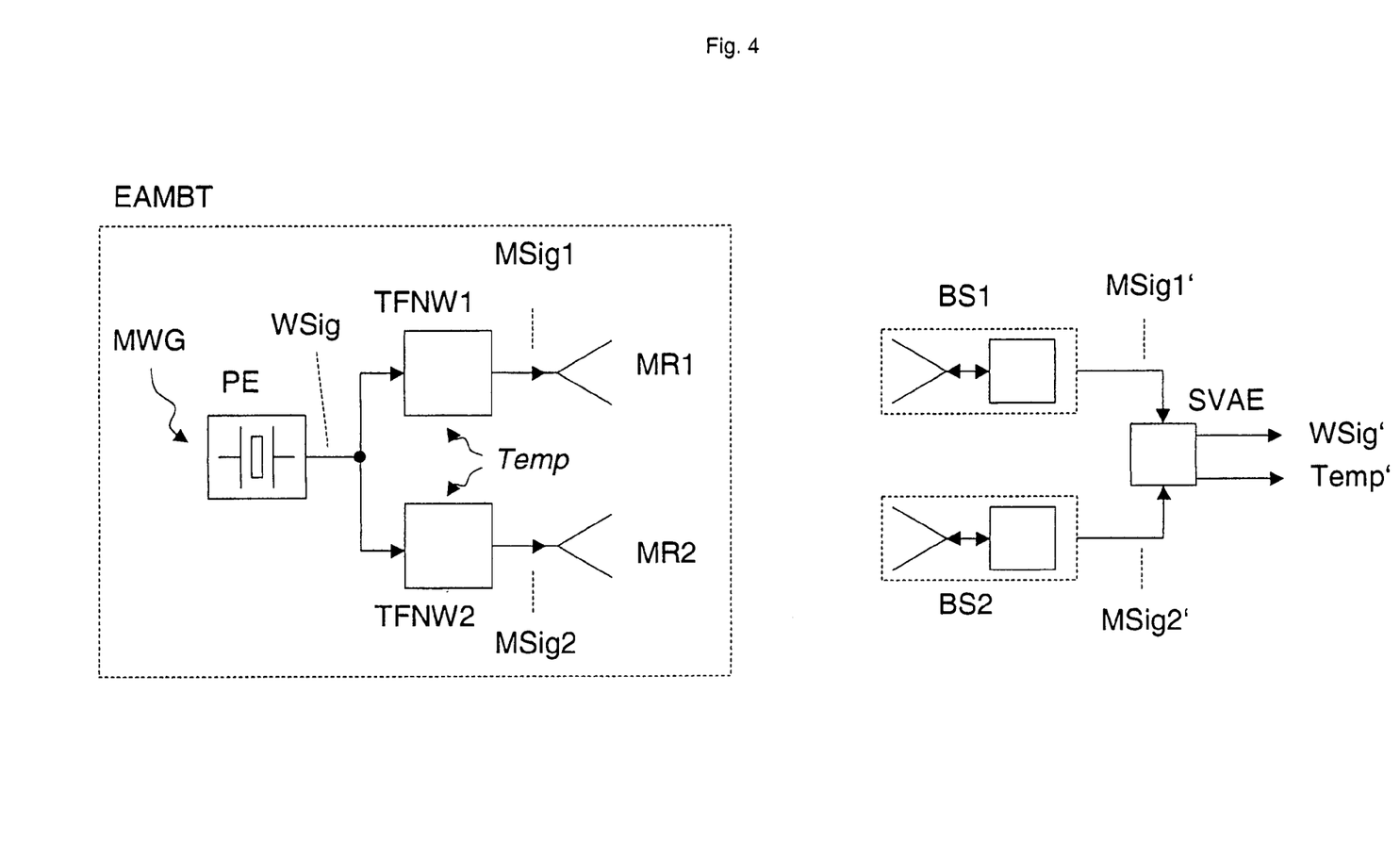

The embodiment illustrated in FIG. 3 starts by assuming that the nature, such as for example the spectral distribution of the alternating value WSig is known. However, this cannot always be taken as a starting point. Consequently, it is not always possible to determine or transfer exact measurement data with such a simple embodiment as the one shown in FIG. 3. FIG. 4 shows an embodiment that solves this problem.

Indicated here is the fact that the alternating value WSig is derived, for example, from a mechanical alternating value via a piezoelement PE. Of importance for the embodiment is the fact that the alternating signal WSig splits up into at least two paths and that further processing differs on these paths. In order to implement a temperature sensor, the backscatter transponder EAMBT features a temperature-dependent filter network TFNW1 or TFNW2, for example, in each path. These filter networks can, for example, as described above, be embodied as frequency-specific filters, delay elements, phase shifters or attenuators.

The decisive factor is that the influence exerted by TFNW1 and TFNW2 when applied to the alternating value WSig depends, differing in a characteristic way, on the measured quantity, i.e. here the temperature Temp. The resulting differently influenced modulation signals MSig1 and MSig2 are then transferred according to the interrogating principle described above to separate channels, for example, via separate frequency bands to separate base stations BS1 and BS2 and are reconstructed there as signals MSig1' and MSig2' as shown above. The signal comparison and evaluation unit SVAE can then, based on the well-known properties of the filter networks TFNW1 and TFNW2, derive the temperature measured value Temp and/or an image of the alternating value WSig.

Preferably, the signal comparison and evaluation unit SVAE includes a processor for this purpose. The basic idea of the embodiment is that the measured value is no longer directly derived from the absolute characteristic values of a signal, but from a relative comparison between at least two signals MSig1' and MSig2'. This gives much better control over preventing the possibly changing and unknown properties of the alternating value WSig disturbing the evaluation and the derivation of the measured quantity.

If the filter networks TFNW1 and TFNW2 are embodied, for example, as temperature-dependent delay elements, in which case the delay difference between the two signal paths with the temperature should change characteristically, then the delay difference of signals MSig1' and MSig2' that specifies a temperature measurement, can then easily be determined, for example, by using a cross-correlation between MSig1' and MSig2'. The maximum cross-correlation position would, for example, here be a measurement for the temperature. If temperature-dependent phase shift elements are used in TFNW1 and TFNW2, a simple analog or digital phase comparator could also undertake a comparable function.

The embodiment shown only represents a possible variant. As already shown above, other measured values such as perhaps the tire pressure, stress value, elongation value and the coefficient of friction, frictional connection, road surface texture, rolling friction, aquaplaning, tire wear, etc. can also be determined directly or indirectly in the same way. Methods for this are mentioned, for example, in J. Stöcker et al.: "Erkennung inhomogener Kraftschlußverhältnisse zwischen Reifen und Fahrbahn am Beispiel Aquaplaning" (identifying the inhomogeneous frictional connection relations between the tire and road surface taking aquaplaning as an example), VDI reports No. 1088, pages 345 to 369, 1993. It would also be conceivable to not carry out the division into at least two paths at the level of the measured value-dependent filter networks, but instead to use at least two separate energy converters at once.

Figure 5:
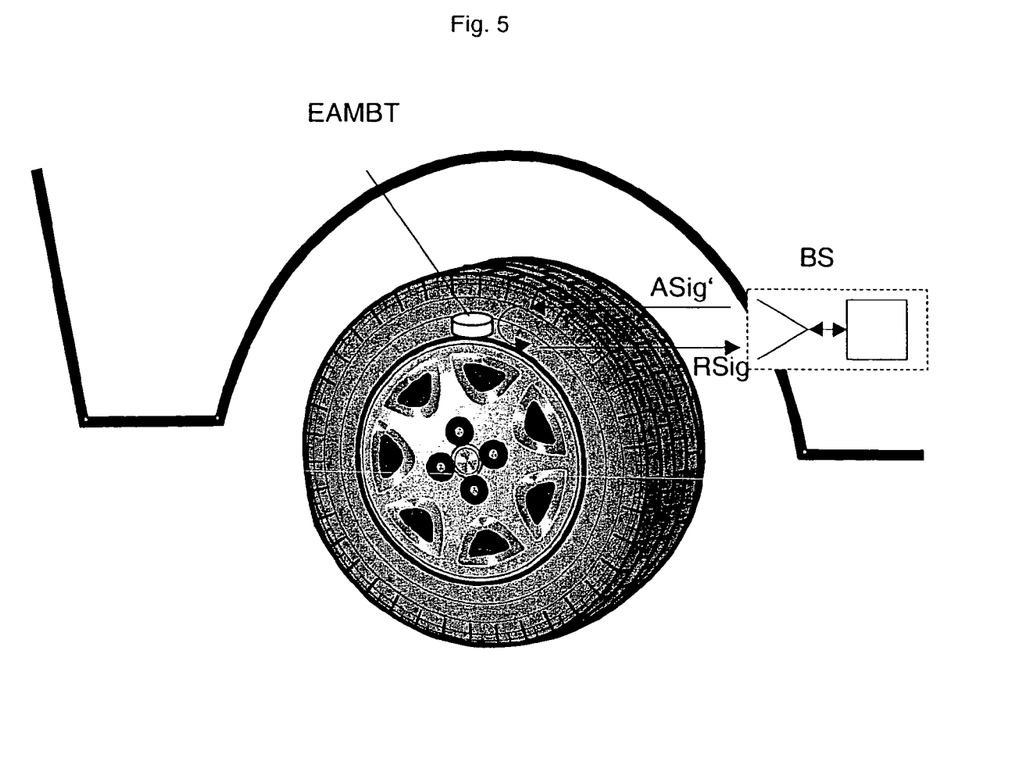

FIG. 5 shows an embodiment of a tire measuring device as a tire sensor with a backscatter transponder EAMBT. The structure-borne sound converter of the backscatter transponder EAMBT is connected to the tire cover or vulcanized into the tire.

Figure 6:
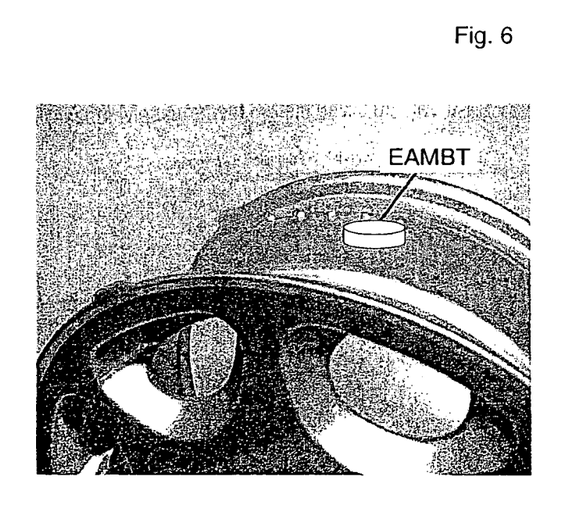

It would also be conceivable to fit the sound converter to the rim, as is shown in FIG. 6.

Figure 7:
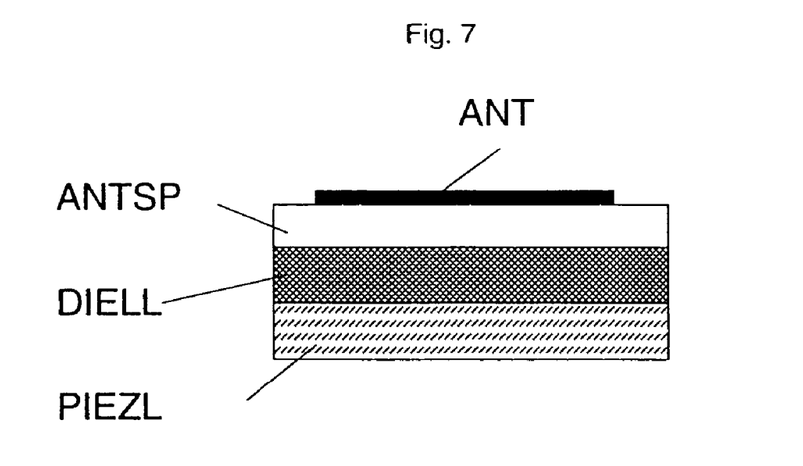

FIG. 7 shows a particularly advantageous embodiment and construction technique of a backscatter transponder EAMBT that is suited in a special way to the harsh requirements that must be set for a tire sensor. The backscatter transponder EAMBT is shown here completely implemented as a ceramic element, i.e. without any semiconductor element. This ceramic element is divided into different functional layers. A first ceramic, piezoelectric PIEZL layer serves as an energy converter by means of which an acoustic signal or a mechanical force is converted into an alternating voltage. This layer is also separated directly or optionally, if required, by intermediate layers, connected to a layer DIELL that includes a controllable dielectric that has paraelectrical properties. The functionality of this DIELL layer is based on controlling its dielectricity value by an outer electrostatic field generated by a control voltage. The control voltage is generated, as shown above, in the piezoceramic layer PIEZL. The ceramic functional layer DIELL offers the advantage of a continuous, quick, quasi-wattless control up to the high GHz range and it functions as a passive component, i.e. no semiconductor components whatsoever are required. The controllable dielectric layer DIELL is used in the same way as is customary with a field effect transistor in backscatter transponders for modulating the reflection phase, frequency or amplitude. The controllable dielectric layer could, for example, include a ferroelectric or paraelectric material system such as barium/strontium titanate (BST) or BZT as is, for example, shown in M. Voigts, W. Menesklou, E. Ivers-Tiffée: "Dielectric Properties and Tunability of BST and BZT Thick Films for Microwave Applications", 13th International Symposium on Integrated Ferroelectrics, Colorado Springs, Mar. 11–14, 2001. Liquid crystals are also well-suited as controllable dielectrics.

A particularly compact backscatter transponder module is obtained if the antenna ANT is also embodied as a ceramic structure and it shows a further layer of the complete ceramic module.

An antenna carrier ANTSP is arranged between the antenna ANT and a controllable dielectric layer DIELL.

The entire module can be constructed on the basis of low temperature cofired ceramics (LTCC). It would be conceivable here to embed passive circuits in further layers that detect extended sensor functionality, as can be seen in FIGS. 3 and 4. Discrete components can also be arranged on the back of the ceramic module that cannot be integrated into the ceramic module.

The principle and embodiment has the advantage that the tire measuring device, because of its simple construction and the absence of a battery, can be an extremely light unit and can, therefore, also easily be attached to rapidly rotating parts and operated there and, if required, can even be vulcanized into the tires.

The frequencies that would be useful and normal in other transponder systems, i.e. 125 kHz, 250 kHz, 13.7 MHz, 433 MHz, 869 MHz, 2.45 GHz or 5.8 GHz are preferably used as interrogation signal of the base station. It is also useful for the frequency of the interrogation signal to be selected to be much higher, for example, by a factor of 10, than the frequency of the alternating value since the carrier, i.e. the interrogation signal can then be separated more easily from the modulation in the base station using simple means.

A further development of the above principle is that piezoelectric composites, for example, based on piezofibers, are used as acoustic or mechanical energy converters.

Piezoelectric fibers integrated in fiber composites offer, because of their flexibility, an optimum mechanical structure conformity between the base metal and the active piezo-components that could otherwise not be reached with customary piezofoils or ceramics. Therefore, these structures are particularly suited for use on a tire cover or even vulcanized into a tire cover or a tire.

The basic descriptions of such fiber composites can be found in B. Z. Janos, N. W. Hagood: "Overview of active fiber composite technologies", Proceedings of the 6th International Conference on new Actuators, ACTUATOR98, June 98, Bremen, Germany or in K. Pannkoke, T. Gesang, M. Clüver, D. Sporn and A. Schörnecker: "Strukturkonform integrierbare Funktionsmodule auf der Basis von PZT-Fasern" (structure-conforming integrative functional modules on the basis of PZT fibers), ADAPTRONIC CONGRESS 1999, $3^{rd}$-$4^{th}$ March in Potsdam, pp. 138–143.

In addition to these optimum mechanical properties use according to the invention, piezofibers also offer outstanding options for the purposes of a tire sensor system. If the fibers are fixed into or onto the tire cover in such a way that the mechanical stress at the tire profile elements leads to an elongation, compression or bending of the piezofibers, the mechanical load profile between the profile elements and the road surface is mapped to an equivalent electrical alternating voltage.

As described on the basis of FIGS. 1 to 4, this alternating signal according to the EAMBT principle can be transferred by radio to a base station.

Figure 8:
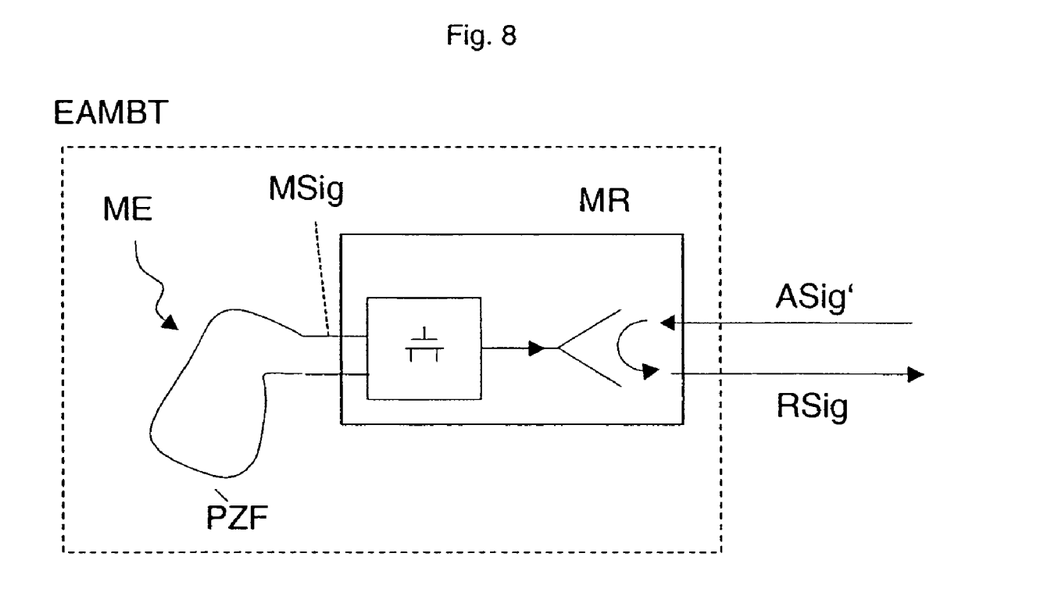
Figure 9:
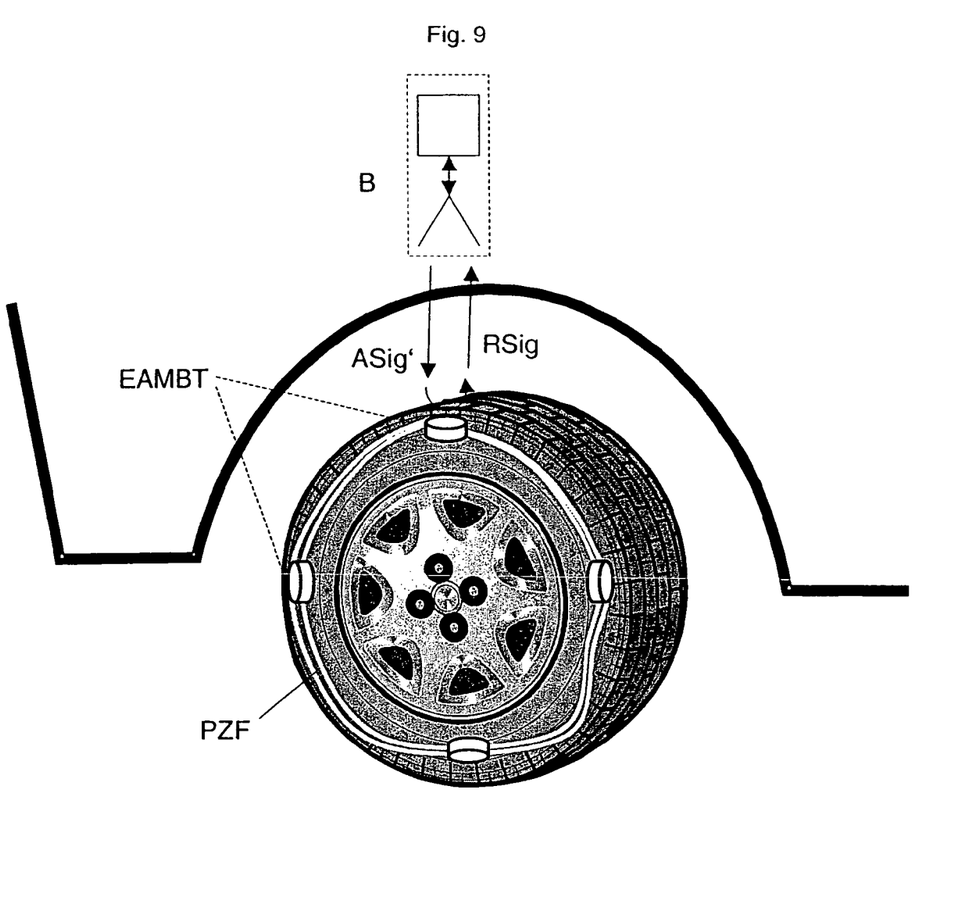

An embodiment of a backscatter transponder EAMBT with piezofibers PZF can be seen in FIG. 8. A schematic embodiment of the entire tire sensor system is illustrated in FIG. 9.

The alternating signal generated and transferred by radio can then be analyzed in the base station and in this way the underlying mechanical values such as the frictional connection, friction coefficient, wear, etc. for energy generation can be concluded.

Furthermore, by laying and designing the fibers in a suitable way, it can be ensured that forces ME definitively only lead to an electrical voltage for specific directions of the dynamic effect. In this way the mechanical key data for all the directions is determined separately or a multidimensional force/voltage vector can be detected.

Figure 10:
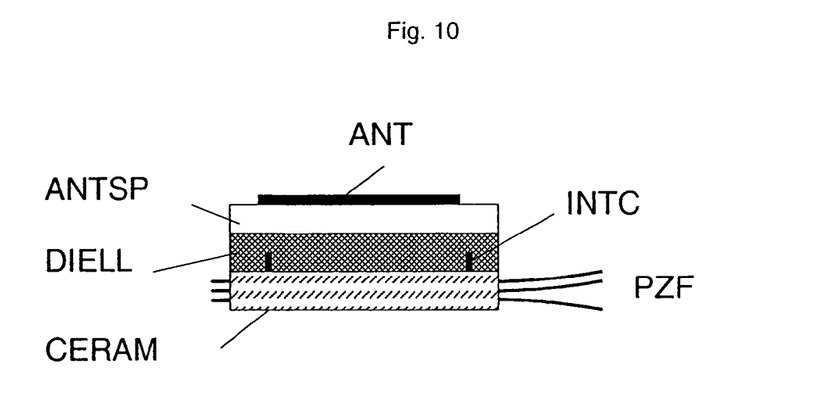

The backscatter transponder EAMBT or central parts thereof can also be embodied as a ceramic module when piezoelectric composites are used. The only difference to the above embodiments is that there is no piezoceramic layer and, therefore, the piezofibers have to be connected. This connection can, for example, be carried out in such a way that the fibers PZF are connected to a ceramic layer via and/or through channels. It would, for example, be advantageous for the fibers PZF to be immediately embedded during the sinter process of the ceramic module into the latter. It would also be conceivable to attach the fibers onto and/or to metallic structures on the surface of the ceramic material CERAM as shown in FIG. 10.

In addition, the antenna element of the sensor can also be located away from the sensor and only connected to it by electrical line. The sensor signals produced by the tire grip with the road surface contact area are then immediately relayed to the antenna that is then advantageously opposite the base station antenna. Through induced coupling the steel belt of the tire can also be used as the sensor antenna.

We claim:

1. A tire measuring device comprising:
    a converter for converting ambient energy to an alternating value;
    a reflector for an electromagnetic signal that can be modulated via the alternating value;
    a piezoelectric layer as the energy converter, and
    a layer with a controllable dielectric.

2. The tire measuring device according to claim 1, wherein the reflector comprises a reflector for a high-frequency electromagnetic signal.

3. A tire measuring device according to claim 1, wherein the tire measuring device further comprises an antenna.

4. A tire measuring device according to claim 1, wherein the tire measuring device is a backscatter transponder.

5. A tire measuring device according to claim 1, wherein the tire measuring device comprises a sensor for determining a measured value.

6. A tire measuring device according to claim 5, wherein the converter converts the ambient energy to an alternating value as a function of the measured value.

7. A tire measuring device according to claim 5, wherein the tire measuring device comprises a means to influence the alternating value as a function of the measured value.

8. A tire measuring device comprising:
    a reflector for an electromagnetic signal that can be modulated via the alternating value;
    wherein the alternating value comprises a first alternating value and a second alternating value; and
    wherein the first and second alternating values are alternating values which are derived from an original alternating value that can be broken down and wherein, after the breakdown, the first and second alternating value can be influenced differently by a measured value.

9. The tire measuring device according to claim 8, further comprising a second converter for generating the second alternating value.

10. A tire measuring device according to claim 1, wherein the converter comprises at least one piezoelectric fiber.

11. A tire comprising a tire measuring device comprising:
    a converter for converting ambient energy to an alternating value;
    a reflector for modulating an electromagnetic signal that can be modulated via the alternating value;
    a piezoelectric layer as the energy converter, and
    a layer with a controllable dielectric.

12. A tire according to claim 11, wherein the tire measuring device is connected to the tire cover.

13. A rim with a tire measuring device, said device comprising:
    a converter for converting ambient energy to an alternating value wherein the alternating value comprises a first alternating value and a second alternating value;
    a reflector that can be modulated via the alternating value;
    a piezoelectric layer as the energy converter, and
    a layer with a controllable dielectric.

14. A vehicle comprising:
    a plurality of tires, wherein each tire comprises a tire measuring device comprising:
    a converter for converting ambient energy to an alternating value, the alternating value comprising a first alternating value and a second alternating value, and
    a reflector that can be modulated via the alternating value;
    a piezoelectric layer as the energy converter; and
    a layer with a controllable dielectric.

15. A method for tire measurement comprising the steps of:
    converting the ambient energy to an alternating value,
    modulating a reflector via the alternating value, and
    generating a first alternating value and a second alternating value, wherein the first and second alternating values are alternating values which are derived from an original alternating value that can be broken down and wherein, after the breakdown, the first and second alternating value can be influenced differently by a measured value.

16. The method according to claim 15, wherein the step of converting the ambient energy to an alternating value is performed as a function of a measured value.

17. The method according to claim 15, further comprising the step of influencing the alternating value as a function of a measured value.

* * * * *